United States Patent
Jain et al.

(10) Patent No.: US 7,772,811 B1
(45) Date of Patent: Aug. 10, 2010

(54) POWER SUPPLY CONFIGURATIONS AND ADAPTIVE VOLTAGE

(75) Inventors: Praveen K. Jain, Kingston (CA); Shangzhi Pan, Kingston (CA)

(73) Assignee: CHiL Semiconductor Corporation, Tewksbury, MA (US)

( * ) Notice: Subject to any disclaimer, the term of this patent is extended or adjusted under 35 U.S.C. 154(b) by 439 days.

(21) Appl. No.: 11/879,043

(22) Filed: Jul. 13, 2007

(51) Int. Cl.
G05F 3/16 (2006.01)
G05F 1/00 (2006.01)

(52) U.S. Cl. .................. 323/224; 323/283; 323/284; 323/285; 323/272

(58) Field of Classification Search ............ 323/224, 323/272, 283, 284, 285
See application file for complete search history.

(56) References Cited

U.S. PATENT DOCUMENTS 6,804,102 B2 * 10/2004 Hamon et al. ............ 361/93.3
7,095,217 B1 * 8/2006 Niculae et al. ............ 323/274
7,109,692 B1 * 9/2006 Wu et al. .................. 323/282
7,511,545 B1 * 3/2009 Kesler ...................... 327/175
7,548,047 B1 * 6/2009 Dasgupta et al. ......... 323/283

* cited by examiner

*Primary Examiner*—Shawn Riley
(74) *Attorney, Agent, or Firm*—Chapin IP Law, LLC; Barry W. Chapin, Esq.

(57) ABSTRACT

A power supply circuit includes one or more reference voltage generators that respectively generate a time-varying output voltage reference value as well as a corresponding time-varying output current reference value. During operation, the reference voltage generators produce different step values for the time-varying output voltage reference value and the corresponding time-varying output current reference value over time such that the power supply has a substantially fixed output impedance value. According to one configuration, the time-varying output voltage reference value tracks the power supply output voltage. Via a comparison of the power supply output voltage with respect to the adaptive output voltage reference voltage value and a comparison of the output current to the corresponding time-varying output current reference value, a controller circuit associated with the power supply controls switching operation of the power supply to regulate the power supply output voltage.

34 Claims, 11 Drawing Sheets

POWER SUPPLY CONFIGURATIONS AND ADAPTIVE VOLTAGE

BACKGROUND

As is well known in the art, conventional voltage regulator modules (e.g., a VRM) can be used to regulate corresponding DC voltages supplied to loads, such as microprocessors. A conventional VRM can include a power converter, such as a DC-DC converter, and may include other components such as a controller for controlling operation of the power converter.

An example of a conventional DC-DC converter is a synchronous buck converter, which has minimal components, and therefore is widely used in VRM applications. In an example application, the input voltage to the buck converter is typically around $12V_{DC}$. An output voltage produced by the VRM may be on the order of $5.0V_{DC}$, $3.3 V_{DC}$, or even lower as new semiconductor technology operates at yet lower voltages.

A typical configuration of a conventional switching power supply such as a so-called synchronous buck converter includes an inductor, a high side switch, and a low side switch. A controller associated with the buck converter repeatedly pulses the high side switch ON to convey power from a power source through the inductor to a dynamic load. In addition to controlling the high side switch, the controller repeatedly pulses the low side switch ON to provide a low impedance path from a node of the inductor to ground in order to control an output of the buck converter. Thus, the energy stored in the inductor increases during a time when the high side switch is ON and decreases during a time when the low side switch is ON. As mentioned, during switching operation, the inductor transfers energy to a corresponding load such as a microprocessor device.

Conventional loads such as microprocessor circuits can sometimes consume large amounts of energy. It is therefore a requirement that a corresponding power supply circuit be able to supply such energy on short order, while maintaining regulation. Such a requirement has put a strain on conventional power supply designs.

To decrease power consumption and increase speed, the next generation of computer microprocessors will operate at significantly lower voltages and higher currents than today's microprocessors. Recently, the conventional supply voltage has been reduced to around 1V, which used to be 5V or 3.3V five or ten years ago. Providing a power supply that can meet the new demands can be challenging.

It is expected that, in the future, a required supply voltage is going to drop to a level of 0.8V or lower. Future processors are expected to require more than 200 Amperes of current at a voltage of about 0.8V. Instantaneous or transient current needs associated with a load can require current ramping of upwards of around 120 Amps/nanosecond. As mentioned, a need for such high current makes it much more difficult to maintain an accurate voltage regulation within tight tolerance range for voltage regulator modules (VRMs).

SUMMARY

Conventional voltage converter circuits as discussed above can suffer from a number of deficiencies. For example, to meet transient requirements, conventional voltage regulator circuits must sometimes employ use of many capacitors to temporarily store energy that will be supplied to a dynamic load on an as-needed basis. Use of many bank capacitors in a respective power supply circuit increases both its size and associated cost. Additionally, a power supply circuit having an excessive number of so-called bank capacitors may be more prone to failure. Thus, use of an excessive number of bank/filter capacitors is often undesirable.

The conventional concept of adaptive voltage positioning (a.k.a., AVP) has been widely used in more recent conventional voltage regulator designs. Adaptive voltage positioning entails controlling a power supply output voltage, Vo, with respect to a fixed reference voltage, Vref so that a respective power supply circuit has a corresponding fixed output impedance. For example, one conventional AVP method includes employing a fixed reference voltage in a respective conventional power supply circuit. A controller associated with the power supply controls a power supply output voltage based on Vref-Io $R_{ESR}$, instead of driving the output voltage of the power supply to Vref. In such a case, the power converter circuit behaves as a voltage source with value Vref and output impedance that is always real and equal to $R_{ESR}$.

It is sometimes impossible to achieve a constant power supply output impedance via use of a voltage-mode control. In a current-mode control application, the AVP design depends on the accuracy of the DC (Direct Current) gain. A technique known as active droop control can be used to solve these problems by using an infinite DC gain design. However, the time constant of output filtering capacitor can have a significant impact on the feedback loop design and the converter performance. It is therefore often difficult to precisely maintain a desired output impedance via conventional methods. Moreover, it's not easy to modify the output impedance while the power supply is online (e.g., actively maintaining an output voltage).

Digital controllers are potential candidate circuits for use in voltage regulation modules (VRMs) since they offer potential advantages of lower sensitivity to parameter variations, programmability, design flexibility and ease of integration with other digital parts in the system. Attempts have been made to implement adaptive voltage positioning via conventional digital circuits. All of such attempts are directly translated from their analog parts. The digital implementation of peak current control is trying to catch the point of peak current by a current ADC (e.g., Analog to Digital Converter), therefore an ADC with a sample frequency at 100 times switching frequency is needed. The digital implementation of active droop control includes a sensed inductor current that is added to the sensed output voltage before the ADC to form droop function. Such conventional power supply circuits have the same limitations as do their analog counterparts.

Techniques discussed herein deviate with respect to conventional applications such as those discussed above as well as other techniques known in the prior art. For example, certain embodiments herein are directed to enhancing an ability of a power supply circuit to provide high transient current to dynamic loads, without imparting or generating substantial "ringing" on the power supply output voltage under such transient conditions.

More specifically, an example power supply circuit can include one or more reference voltage generators that respectfully generate a time-varying output voltage reference value as well as a corresponding time-varying output current reference value. As their names suggest, the time-varying output voltage reference and time-varying output current reference change over time. For example, during operation, the reference voltage generators set the time-varying output voltage reference value and the corresponding time-varying output current reference value to specific step voltage values over time such that the power supply has a substantially fixed output impedance value. To maintain a fixed output impedance, as the time-varying output voltage reference increases, the corresponding time-varying output current reference decreases and vise-versa.

The time-varying output voltage reference value can track the power supply output voltage. Via a comparison of the power supply output voltage with respect to the time-varying or adaptive output voltage reference value and a comparison of the output current to the corresponding time-varying output current reference value, a controller circuit associated with the power supply controls switching operation of the power supply to regulate the power supply output voltage.

In further embodiments, a corresponding reference voltage generator produces the time-varying output voltage reference (e.g., an adjustable voltage reference value that changes over time as its name suggests) to toggle between different step voltage values. For example, the reference generator can periodically or occasionally adjust the time-varying output voltage reference value different step voltage values so that the time-varying output voltage reference value tracks the power supply output voltage.

When the time-varying output voltage reference "catches up" with the power supply output voltage after a transient condition, when the output ripple voltage is small such as less than the different between voltage steps from one cycle to another, the corresponding voltage reference generator can periodically adjust the time-varying output voltage reference to successively switch between a step voltage value greater than the power supply output voltage and a successive step voltage value that is less than the power supply output voltage. Accordingly, the time-varying output voltage reference can be modified (in a step manner) so that the time-varying output voltage reference vacillates (or attempts to vacillate) about the time-varying output voltage reference.

A controller associated with the power supply circuit can be configured to control the switching operation of the power supply. For example, the controller can be configured to initiate activation of a high side regulator switch of the power supply in response to detecting that the power supply output voltage is below a present value of the adjustable output voltage reference value. Activation of the high side regulator switch increases an amount of output current associated with the power supply output voltage.

After initiating activation of the switch, the power supply circuit compares the amount of output current (associated with the power supply output voltage) to the current value of the time-varying current reference value. The controller circuit can be configured to limit the output current associated with the power supply output voltage by deactivating the switch when the power supply output current equals or exceeds a current value of the time-varying output current reference value.

This process of monitoring and controlling an output voltage associated with the power supply circuit can be repeated over subsequent monitor and control cycles to regulate the output voltage of the power supply circuit.

As discussed, the power supply circuit can be configured to provide a substantially constant or fixed power supply output impedance. However, note that other embodiments include modifying the output impedance "on-the-fly" when needed.

For example, because of a component or an environmental condition, the output voltage variation of the power supply output voltage may reach an allowed minimum voltage. In response to such a condition, the output impedance can be adjusted online (e.g., such as when the regulator is actively controlling the output voltage applied to a respective load) to a value of zero in order to stop the output voltage falling further due to increased current demands by the load.

As mentioned above, the basic idea to achieve a "controlled" output impedance (e.g., a time-varying or static output impedance) is that variation of the power supply output voltage and the power supply output current are separately controlled via respective time-varying references. Such a scheme is relatively simple to implement and does not necessarily require a compensator in the feedback loop. Thus, according to embodiments herein, there is no need to precisely place poles and zeros as is required in other conventional AVP implementation methods. Limitations of analog methods therefore can be overcome using the novel techniques as described herein.

In one embodiment, a pair of digital-to-analog converters (DAC) can be used to generate the (time-varying) output voltage reference and the (time-varying) output current reference. Based on use of the time-varying output current reference to and limiting a peak output current, even a low resolution DAC can be used to achieve a tight voltage regulation range.

As discussed above, and as will be discussed below, techniques herein are well suited for use in switching power supply circuitry to enhance the ability of a power supply circuit to provide a stable output voltage during transient current conditions. However, it should be noted that embodiments herein are not limited to use in such applications and that the techniques discussed herein are well suited for other applications as well.

Note also that each of the different features, techniques, configurations, etc. discussed herein can be executed independently or in combination with any or all other features also described herein. Accordingly, the present invention can be embodied, viewed, and claimed in many different ways.

This summary section does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to one embodiment, a power supply circuit includes one or more reference voltage generators that respectively generate a time-varying output voltage reference value as well as a corresponding time-varying output current reference value. During operation, the reference voltage generator circuit sets the step values of the time-varying output voltage reference value and the corresponding time-varying output current reference value over time such that the power supply has a substantially fixed output impedance value. According to one configuration, the time-varying output voltage reference value tracks the power supply output voltage. Via a comparison of the power supply output voltage with respect to the adaptive or time-varying output voltage reference voltage value and a comparison of the output current to the corresponding time-varying output current reference value, a controller circuit associated with the power supply controls switching operation of the power supply to regulate the power supply output voltage.

Figure 1:
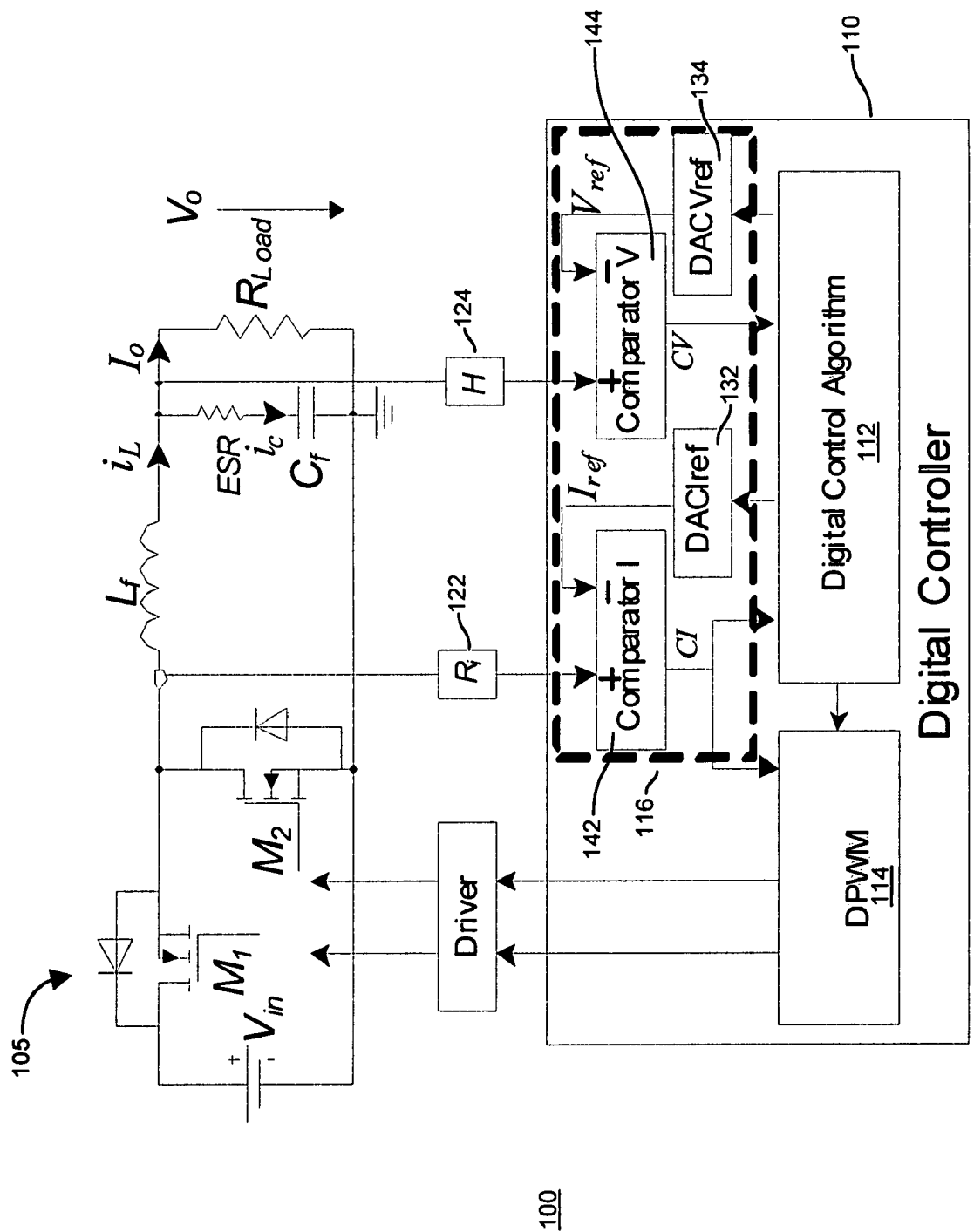
FIG. 1 is an example diagram of a power supply circuit according to embodiments herein.

FIG. 1 is a block diagram of a power control system 100 according to embodiments herein. As shown, the power supply control system 100 includes a switching power supply 105 and a digital controller 110.

Switching power supply 105 includes switches M1 and M2 (e.g., field effect transistors), a dynamic load $R_{LOAD}$ (e.g., a microprocessor, semiconductor device, circuit, etc.), a current sensing module 122, and a voltage sensing module 124. Control of switches M1 and M2 produces output voltage, Vo, applied to the dynamic load. Current sensing module 122 monitors an amount of current $I_L$ through inductor, Lf. Voltage sensing module 124 monitors the output voltage, Vo, applied to the dynamic load. Sensed voltage and current values are fed from current sensing module 122 and voltage sensing module 124 to digital controller 110.

Digital controller 110 includes a digital control algorithm 112, a DPWM 114 (e.g., a Digital Pulse Width Modulator), and an interface module 116. In general, digital controller 110 monitors and controls power supply circuit 105 to produce output voltage, Vo, within a desired range.

According to one configuration, the interface module 116 includes reference voltage generator 132 that produces time-varying output current reference $V_{ref}$ and reference voltage generator 134 that produces time-varying output voltage reference $V_{ref}$. In one embodiment, each reference voltage generator 132 and reference voltage generator 134 are a D/A converter. Combined, the reference voltage generator 132 and reference voltage generator 134 comprise a reference voltage generator circuit that produces multiple reference values for controlling power supply 105.

Interface module 116 further includes comparator 142 (e.g., Comparator I) and comparator 144 (e.g., Comparator V).

Digital controller 110 also includes digital control algorithm 112. In one embodiment, the digital control algorithm 112 produces desired reference current data and the desired reference voltage data for driving reference voltage generators 132 and 134 to produce respective time varying reference voltage values. In other words, the digital control algorithm controls settings associated with reference voltage generator 132 and reference voltage generator 134.

Accordingly, during general operation, reference voltage generator 132 receives (reference current) data from digital control algorithm 112 to generate the peak current reference value, Iref. Reference voltage generator 134 receives (reference voltage) data from digital control algorithm 112 to generate the voltage reference, Vref.

Comparator 142 compares the generated peak current reference value Iref (e.g., the time-varying output current reference) with a present value of the inductor current iL as sensed by current sensing module 122. The comparison result CI (e.g., output of comparator 142) feeds into the digital control algorithm block and the DPWM 114. The DPWM block generates the gate driving signals to control switching (e.g., switches M1 and M2) in power supply circuit 105.

Comparator 144 compares the generated voltage reference Vref (e.g., the time-varying output voltage reference) with a present value of the output voltage, Vo, as sensed by voltage sensing module 124. The comparison result CV feeds into the digital control algorithm 112. Based on such an input, the digital control algorithm block 112 adjusts the output current reference data (to reference voltage generator 132) and the voltage reference data (to reference voltage generator 134) according to the control law as discussed below.

Example Embodiment of a Control Law to Implement AVP

One example embodiment includes implementing digital controller 110 based on adaptive voltage positioning (AVP). In such an embodiment, output filter capacitors typically can be half the size required for a conventional rigid voltage regulator. Thus, implementing AVP in the digital controller 110 can save on cost and circuit area and volume associated with the power supply circuit 105 and digital controller 110.

The basic idea to achieve AVP is to design the output impedance (Ro) of the power supply circuit 105 to be a constant value. The nature of AVP is that the output voltage (Vo) of power supply circuit 105 decreases when the output current (Io) supplied to the dynamic load increases. In other words, the control law ensures that (Vo=Vmax−Io Ro).

A simple and direct adjustment control law to achieve AVP in digital controller 112 is as follow:

i) If logic signal CV output of comparator 144 is high (CV=1), that is, the output voltage Vo exceeds the voltage reference Vref generated by reference voltage generator 134, the digital control algorithm 112 increases reference voltage, Vref (e.g., the voltage produced by reference voltage generator 134), by an amount such as ΔVref. Under such conditions, the digital control algorithm 112 also decreases the peak current reference, Iref (e.g., the voltage produced by reference voltage generator 132), by an amount such as ΔIref. In one embodiment, if Vref reaches an allowed maximum value over successive cycles, no change will be made to Vref.

ii) If logic signal CV output of comparator 144 is low (CV=0), that is, the output voltage Vo is smaller than the voltage reference, Vref, the digital control algorithm voltage 112 decreases the reference voltage value, Vref, by an amount ΔVref. Under such conditions, the digital control algorithm 112 also increases the peak current reference, Iref, by an amount such as ΔIref. In one embodiment, if Vref reaches an allowed minimum value over successive cycles, no change will be made to Vref.

Figure 2:
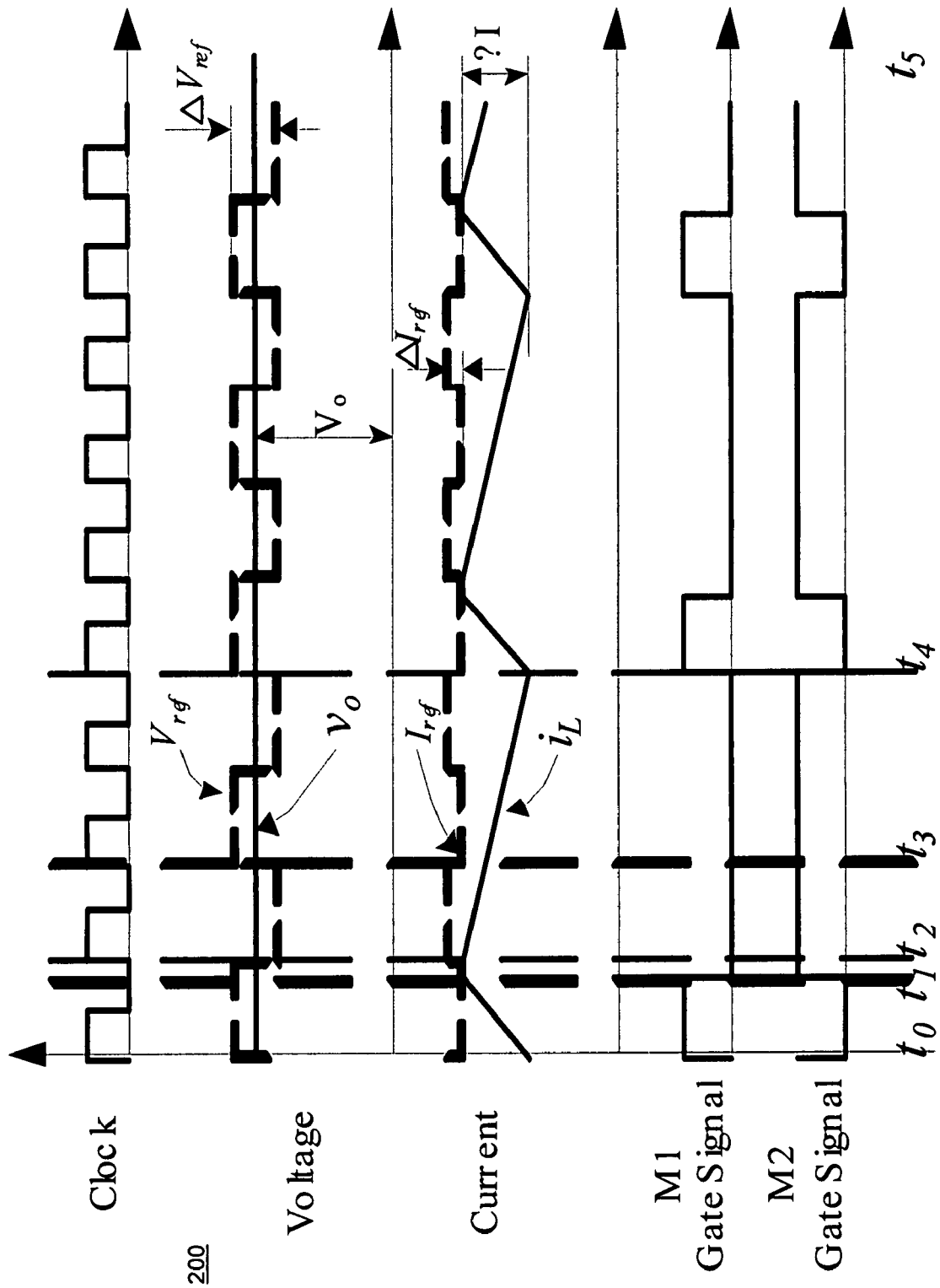
FIG. 2 is an example diagram illustrating timing information associated with switching operations of a power supply circuit according to embodiments herein.

FIG. 2 is an example timing diagram 200 illustrating the steady state operation waveform of power supply circuit 105 according to embodiments herein.

In an example embodiment, the power supply circuit 105 (e.g., buck converter) operates under fixed switching frequency peak current mode control as shown in timing diagram 200. The turn-on of high side switch M1 and the turn-off of low side switch M2 are scheduled with respect to edges of the system clock (e.g., labeled Clock).

In one embodiment, DPWM is a low resolution digital PWM controlling switches M1 and M2.

During operation, the digital controller 110 compares inductor current $I_L$ (as sensed by current sensing module 122) to the current reference Iref generated by reference voltage generator 124. When the inductor current $I_L$ reaches the set peak current reference Iref, the digital control algorithm 112 initiates turn OFF of high side switch M1 and turn ON low side switch M2. As shown in FIG. 2, we can see that both the voltage reference and the current reference are always varying. This is the uniqueness of the proposed controller.

During steady state operation or non-transient conditions, the average output voltage <Vo> tightly tracks within switching step voltage values of <Vref>, as generated by reference voltage generator 134. The error or different between successive step voltage settings of Vref is ΔVref. If ΔVref is smaller than the voltage ripple ΔVp-p associated with output voltage Vo, the voltage reference also will reflect the shape of the voltage ripple.

The peak inductor current, Ipk, can be tightly controlled via use of peak current reference Iref, as generated by reference voltage generator 132. The output, Iref, of reference voltage generator 132 also toggles between different step voltage values. For a buck converter in continuous current mode (CCM), the average inductor current <IL> can be estimated as:

$$I_o = (\langle I_L \rangle) = I_{pk} - \frac{\Delta I}{2} = I_{pk} - \frac{V_o \cdot (1-D) \cdot T_{sw}}{2L_f}$$

Where D is the duty cycle ratio, Tsw is the switching period, and ΔI is the current ripple amplitude.

For a given design, which is assumed to have constant input voltage and output voltage, the duty cycle D is constant, therefore, we will have:

$$\Delta I_o = (\Delta \langle I_L \rangle) = \Delta I_{pk} = (\Delta \langle I_{ref} \rangle) = \Delta I_{ref} \quad (2)$$

$$\Delta V_o = (\Delta \langle V_o \rangle) = (\Delta \langle V_{ref} \rangle) = \Delta V_{ref} \quad (3)$$

$$\Delta I_{ref} = M \frac{I_{ref max}}{2^m} \quad (4)$$

$$\Delta V_{ref} = N \frac{\Delta V_{tol}}{2^n} \quad (5)$$

where ΔIref is the predefined adjustment step of the peak current reference Iref, which is M times least significant bit (LSB) of the current DAC (m bits, reference voltage generator 132), and ΔVref is the predefined adjustment step of the voltage reference Vref, which is N times least significant bit (LSB) of the voltage DAC (n bits, reference voltage generator 134), and ΔVtol is the maximum allowed voltage tolerance.

Note that ΔVref and ΔIref can be static values that do not change over time as illustrated in the figures and as discussed above. In other embodiments, however, note that ΔVref and ΔIref can be adjusted over time based on present operating conditions of the power supply.

For example, the values of ΔVref and ΔIref can be increased during transient conditions when a respective dynamic load requires more or less current. The values of ΔVref and ΔIref also can be reduced or tightened during transient conditions when a respective dynamic load requires more or less current.

As will be discussed later in this specification, the power supply circuit 105 can include multiple phases. In such embodiments, each of the phases can be turned ON or OFF at the same time to maintain the output voltage at a steady value during a respective transient condition.

The power supply control circuit also can include a bypass circuit that is activated during transient conditions when the dynamic load requires an instantaneous increase or decrease in current. In one embodiment, the so-called bypass circuit is activated only during transient conditions to help prevent droop or overshoot on the output voltage.

In yet another embodiment, a combination of activating the bypass circuit and simultaneous control of all phases on or off can help reduce the droop or overshoot on the output voltage.

Features associated with an example transient bypass circuit and/or the multiple phase topology can be found in related earlier filed U.S. patent application Ser. No. 11/261,661, entitled "DIGITAL CONTROLLER FOR A VOLTAGE REGULATOR MODULE," (filed on Oct. 31, 2005, and earlier filed U.S. patent application Ser. No. 11/261,660, entitled "DYNAMIC CONVERSION CIRCUIT FOR A VOLTAGE REGULATOR MODULE," (filed on Oct. 31, 2005, and earlier filed U.S. patent application Ser. No. 11/644,645, entitled "POWER SUPPLY AND RELATED CIRCUITS," (filed on Dec. 22, 2006, and earlier filed U.S. patent application Ser. No. 11/701,877, entitled "POWER SUPPLY AND RELATED CIRCUITS," (filed on Feb. 2, 2007, the entire teachings of all of which are incorporated herein by this reference.

In these further embodiments including a respective bypass circuit and/or extra converter phases, the difference in step voltage values (e.g., ΔVref and ΔIref) for Vref and Iref to control the main phases or phases can be increased or decreased during a time when the bypass (or transient circuit) is activated to compensate for increased or decreased current needs. Dynamically controlling (e.g., changing, adjusting, etc.) the step voltage difference in this way enables the digital controller to control the power supply circuit 105 and produce a relatively fixed output voltage, even during transient load conditions. Under such conditions, conventional power supply circuits produce an unacceptable large droop or overshoot value on the output voltage. Thus, embodiments herein can be particularly useful in applications requiring a steady output voltage over a range of transient load conditions.

Figure 3:
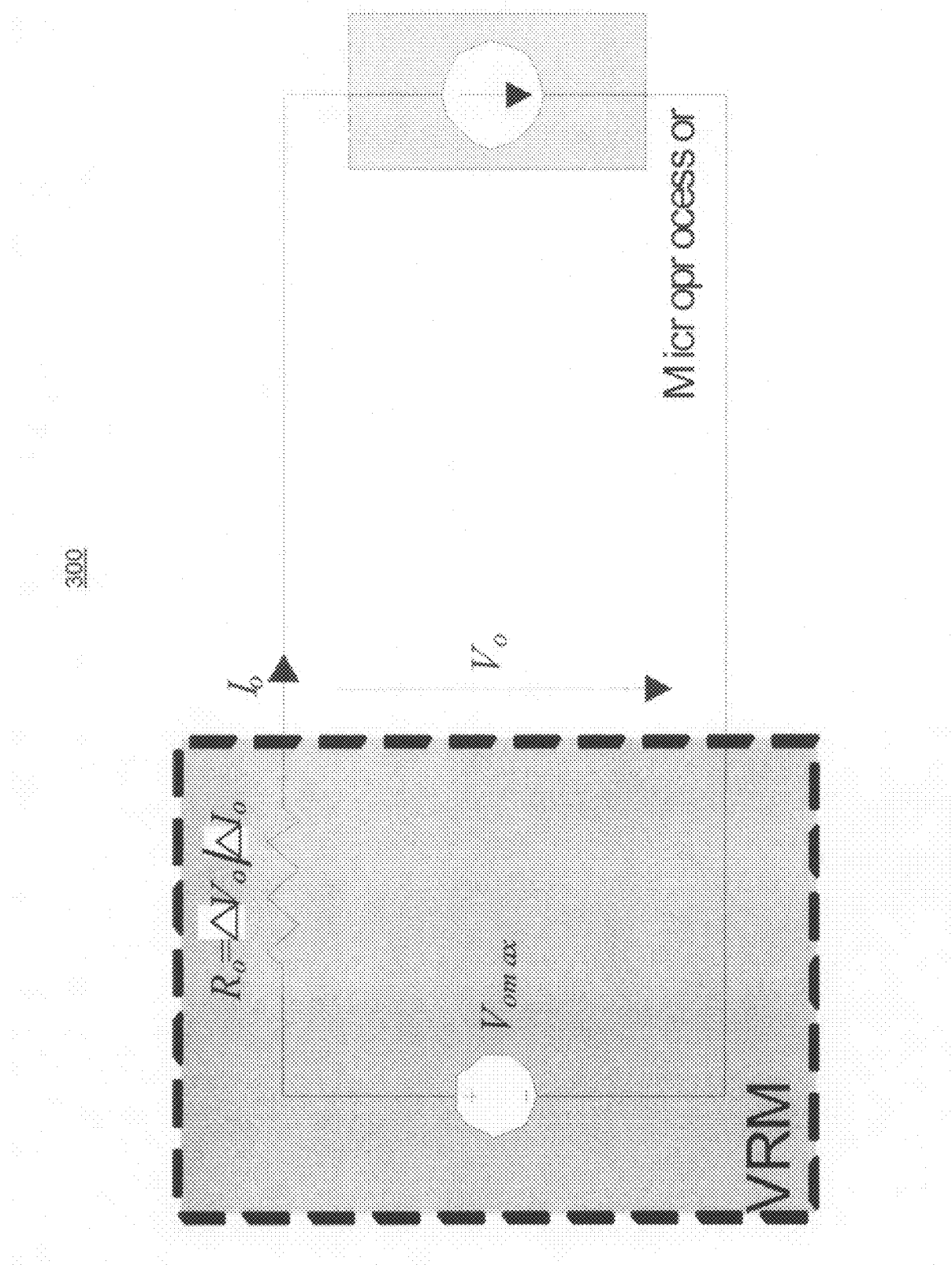
FIG. 3 is an example diagram of a power supply circuit model according to embodiments herein.

Note that FIG. 3 is a diagram of an example equivalent circuit of the power supply circuit 105 according to embodiments herein.

According to control law described above, when the output current Io increases by an amount ΔIo, the output voltage Vo decreases by an amount ΔVo, and vice versa.

When there is no load and current output associated with the output voltage approaches zero, the output voltage Vo will have its largest value (assume to be Vomax). In such an instance, the buck converter with proposed digital controller 110 can be modeled as an ideal voltage source Vomax in series with an equivalent resistor Ro. The equivalent circuit 300 is shown in FIG. 3. Ro can be approximated as:

$$R_o = \frac{\Delta V_o}{\Delta I_o} = \frac{\Delta V_{ref}}{\Delta I_{ref}} = \frac{\Delta V_{tol}}{I_{refmax}} \cdot \frac{N}{M} \cdot 2^{m-n} \quad (6)$$

As mentioned above, a constant output impedance Ro is achieved with this proposed digital controller 110, which is independent of the equivalent series resistance ESR of the output capacitor Cf. From the equivalent circuit, we conclude that $$V_o = V_{omax} = I_o \cdot R_o \quad (7)$$

Therefore, adaptive voltage position (AVP) control is realized. Varying the ratio N/M will adjust the output impedance Ro. In one embodiment, the digital controller 110 is configured with N=M=1. Although the values of N and M vary depending on the embodiment.

Figure 4:
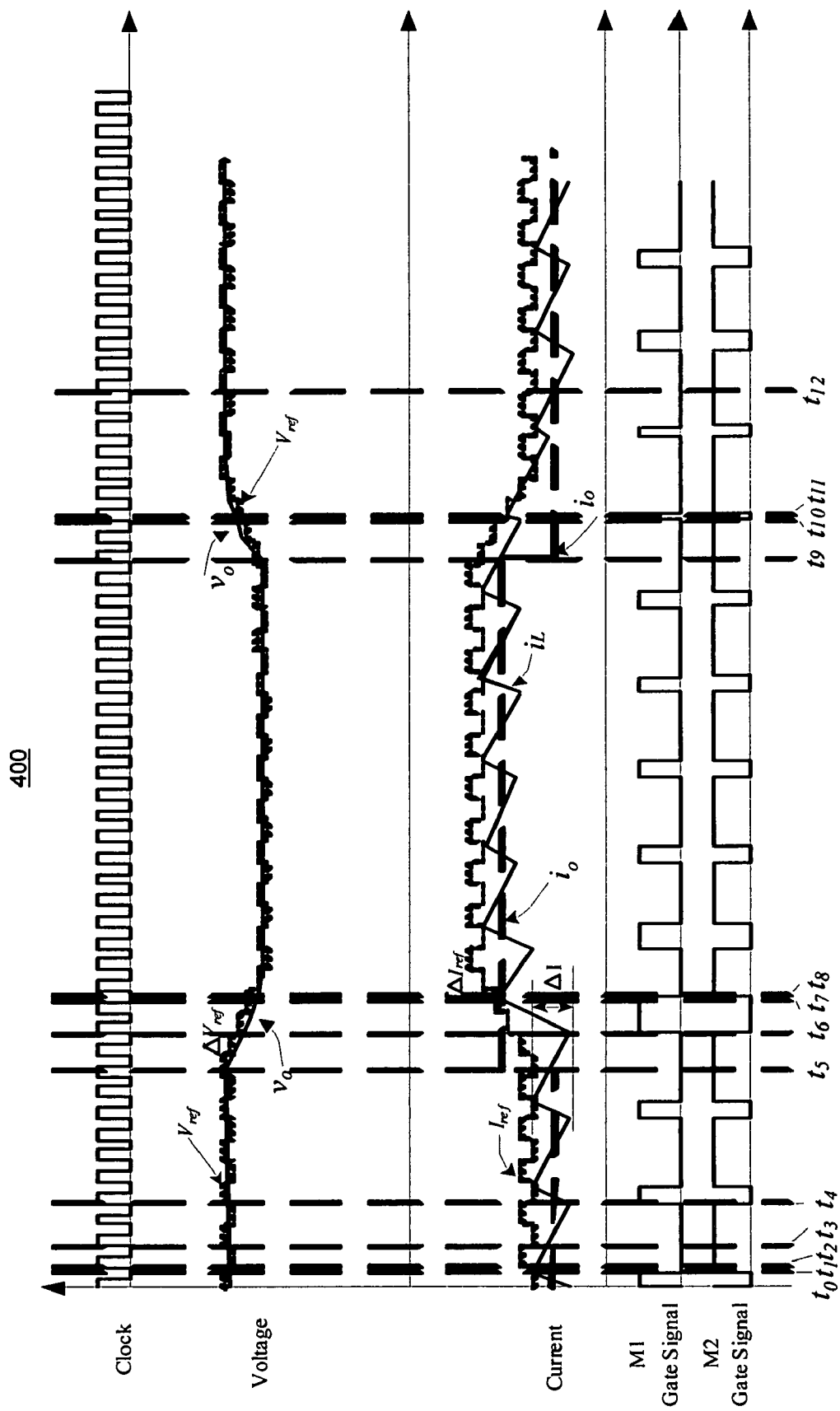
FIG. 4 is an example diagram illustrating timing information associated with operations of a power supply circuit according to embodiments herein.

FIG. 4 is an example timing diagram 400 illustrating typical operation waveforms while steady state, load transient-up, and load transient-down.

As shown, the clock signal associated with digital controller 100 works as the operating clock for both reference voltage generator 132 and reference voltage generator 134. In one embodiment assume that there are four clock periods in one switching cycle. An enlarged view of operation waveforms in the steady state was shown and discussed with respect to FIG. 2 above.

Referring again to FIG. 4, before time t0, the power circuit operates in the steady state. At t0, there is a rising edge of the first clock in a given switching cycle. At such time, switch M1 is turned on and switch M2 is turned off as driven by the DPWM module 114. The inductor current iL increases linearly when the switches M1 and M2 are in this state.

At time t1, the sensed inductor current iL is equivalent to or exceeds the peak current reference Iref. In response to such a condition, the logic comparison result CI associated with comparator 142 changes from a low level to a high level or a logic '1'. At such time, the DPWM 114 turns OFF switch M1 and turns ON switch M2. Thereafter, the inductor current iL decreases linearly.

In the first clock period between time t0 and time t1, the voltage reference Vref is larger than the output voltage Vo. Thus, the logic comparison result CV output of comparator 144 is a low level or logic '0'. As a result, at time t2 or the rising edge of the second clock in the example switching cycle (e.g., t0 through t4), the digital control algorithm 112 decreases the voltage reference Vref (as produced by reference voltage generator 134) by an amount ΔVref and increases the peak current reference Iref (as produced by reference voltage generator 132) by an amount ΔIref.

During the second clock period (between time t2 an time t3), the voltage reference Vref is smaller than the output voltage Vo, and the logic comparison result CV produces a logic '1' output. As a result, at time t3 or the rising edge of the third clock in the sample switching cycle, the reference voltage generator 134 increase voltage reference Vref by an amount ΔVref and reduces the peak current reference Iref by an amount ΔIref. Both voltage reference Vref and the current reference Iref vary by step voltages (ΔVref and ΔIref) according to the logic comparison result CV in the previous clock period, and so on. At t4, a new switching cycle begins.

Accordingly, embodiments herein include, for a first cycle (such as between time t0 and t2): i) setting the time-varying output voltage reference value to be a first step voltage value, and ii) setting the corresponding time-varying output current reference to be a corresponding first step current value. The first step voltage value and the first step current value are selected by the digital control algorithm 112 in accordance with a power supply output impedance value. Additionally, for a second cycle (such as between time t1 and t2), embodiments herein include: i) setting the time-varying output voltage reference value to be a second step voltage value, which is greater than the first step voltage value, and ii) setting the corresponding time-varying output current reference to be a second step current value, which is less than the first step current value. The second step voltage value and the second step current value are also derived based on the substantially fixed output impedance value.

Figure 5:
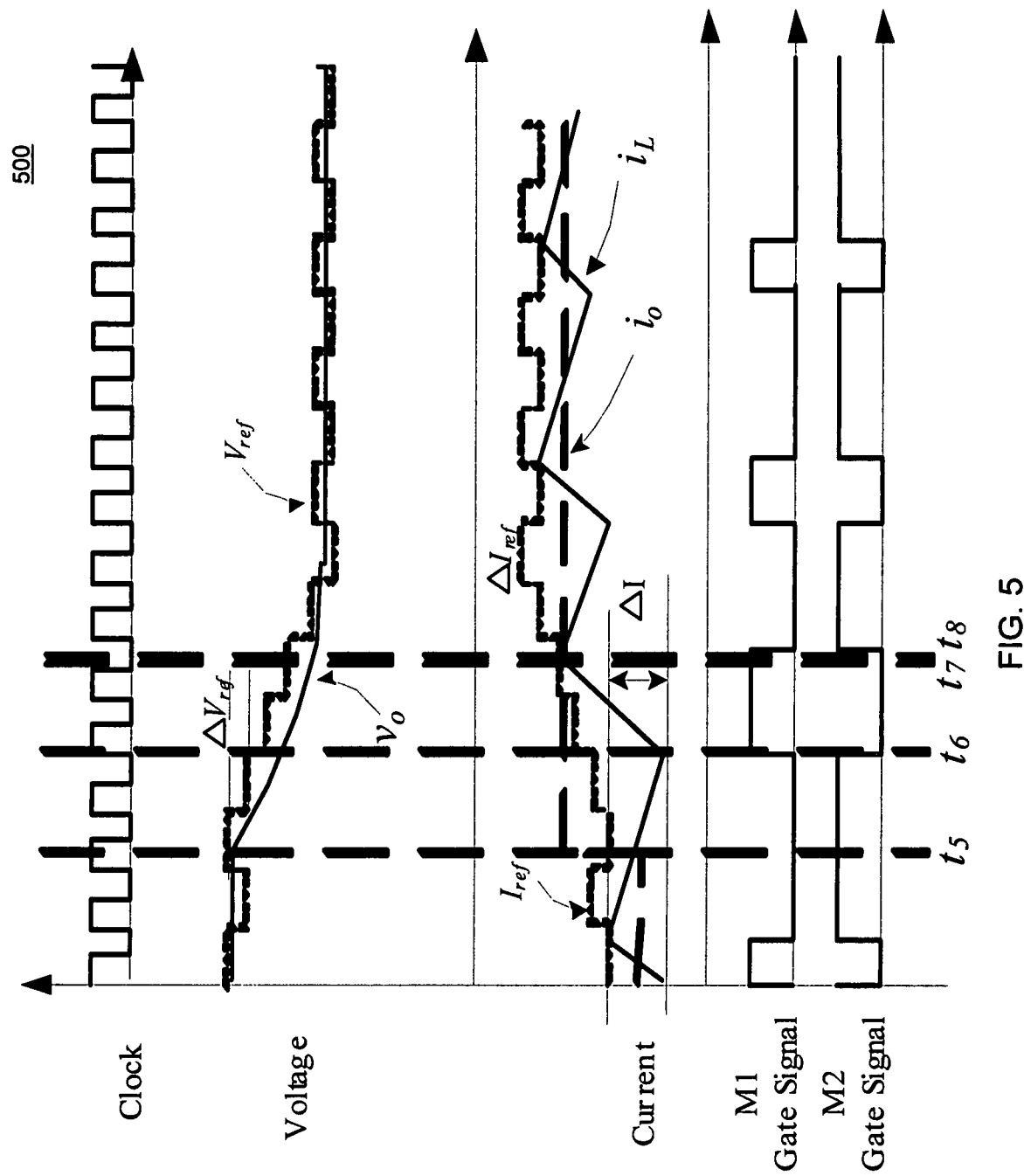
FIG. 5 is an example diagram illustrating timing information associated with operations of a power supply circuit according to embodiments herein.

FIG. 5 is an enlarged or "zoomed in" timing diagram 500 of operational waveforms during a load transient according to embodiments herein. At time t5, assume that a load transient occurs in which the dynamic load increases and requires more current. In such an instance, the output voltage Vo starts to drop as shown. Because of the drop in voltage associated with Vo, the reference voltage Vref no longer vacillates about voltage Vo. In response to such a condition, the digital control algorithm 112 modifies reference voltage Vref to track voltage Vo. For example, the output voltage Vo is smaller than the voltage reference Vref. Based on the control law implemented by digital controller 110, the digital control algorithm 112 initiates reducing the value of voltage reference Vref by an amount ΔVref on a step-by-step basis until it is less than the output voltage Vo again. Because the voltage Vref and current Iref track each other based on a substantially fixed output impedance, the digital control algorithm 112 also initiates increasing the peak current reference Iref by a small amount ΔIref on a step-by-step basis.

The inductor current $I_L$ continues to decrease until, at time t6, the digital controller 110 turns ON switch M1 and turns OFF switch M2 as scheduled by the DPWM module 114. Based on such a switch setting, the inductor current begins to increase. At time t7, the inductor reaches the new load current value.

At time t8, the digital controller 110 turns OFF switch M1 and turns ON switch M2 based on the output (CI) of comparator 142. That is, the current $I_L$ reaches a peak current value and the digital controller 110 shuts off switch M1. The output voltage Vo then establishes a new steady state value.

Figure 6:
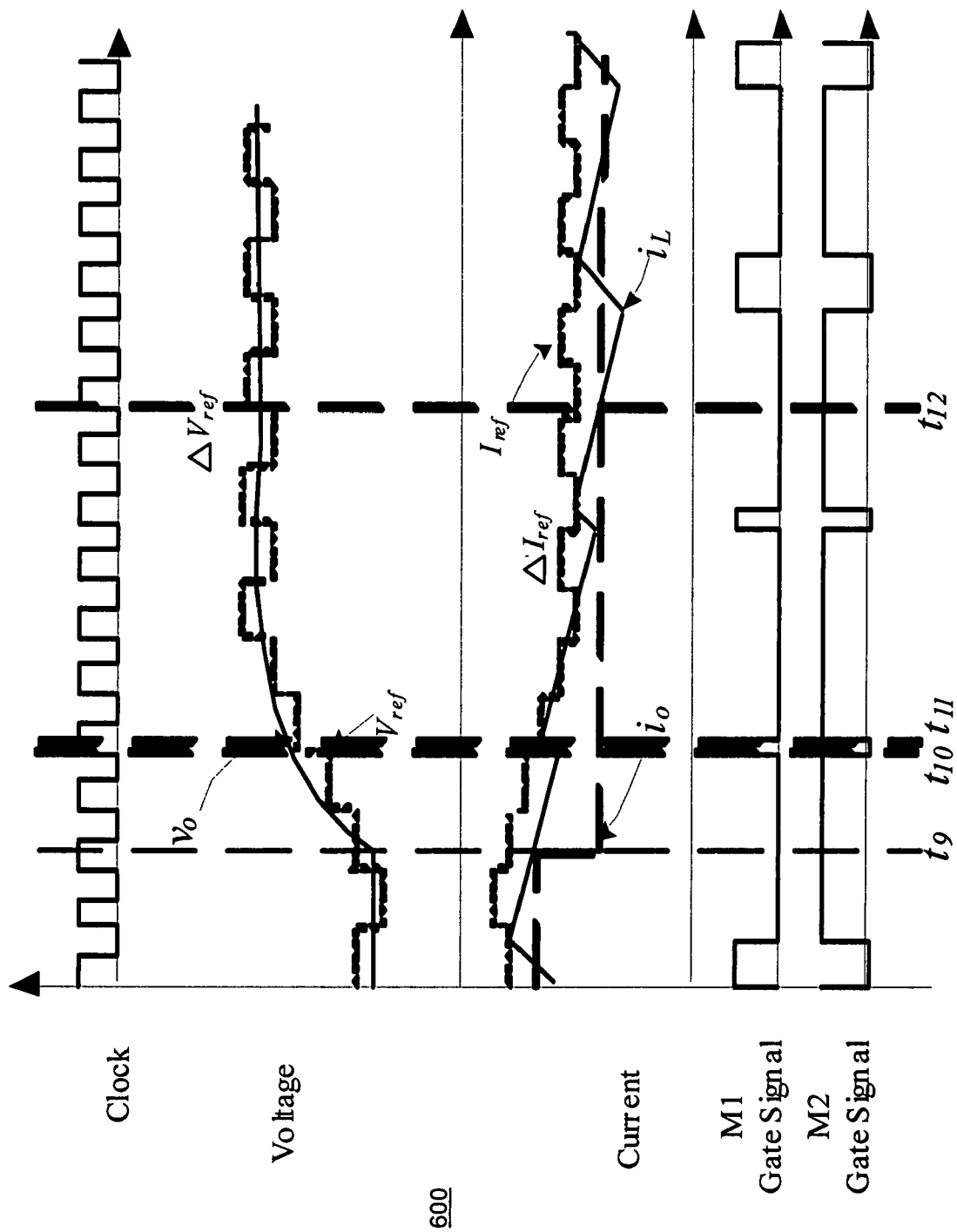
FIG. 6 is an example diagram illustrating timing information associated with operations of a power supply circuit according to embodiments herein.

FIG. 6 is an enlarged view of a timing diagram 600 (e.g., operational waveforms) during a load transient down condition according to embodiments herein. At t9, a decrease in dynamic load occurs. Accordingly, the output voltage Vo begins to rise.

During the transient, the output voltage Vo is now larger than the voltage reference Vref. Based on application of the control law as described herein, the digital controller 110 increases the voltage reference Vref by an amount ΔVref on a step-by-step so that the Vref follows the output voltage Vo. The digital controller 110 decreases the peak current reference value Iref by an amount ΔIref on a step-by-step basis. But the inductor current iL continues to decrease.

At time t10, the digital controller 110 initiates turning ON switch M1 and turning OFF switch M2 as scheduled by the DPWM module 114 since the inductor current iL is less than the peak current reference Iref. After turn on of switch M1, the inductor current begins to increase.

At time t11, the switch M1 is turned off and the switch M2 is turned on based on an output (CI) of comparator 142. The inductor current then begins to decrease.

At time t12, the inductor current reaches the new load current. After that, the output voltage Vo then establishes a new steady state value.

Multiphase Structure

The proposed digital controller 110 can be implemented as a multiphase buck converter circuit. In such an embodiment, a comparator is added for each phase.

Figure 7:
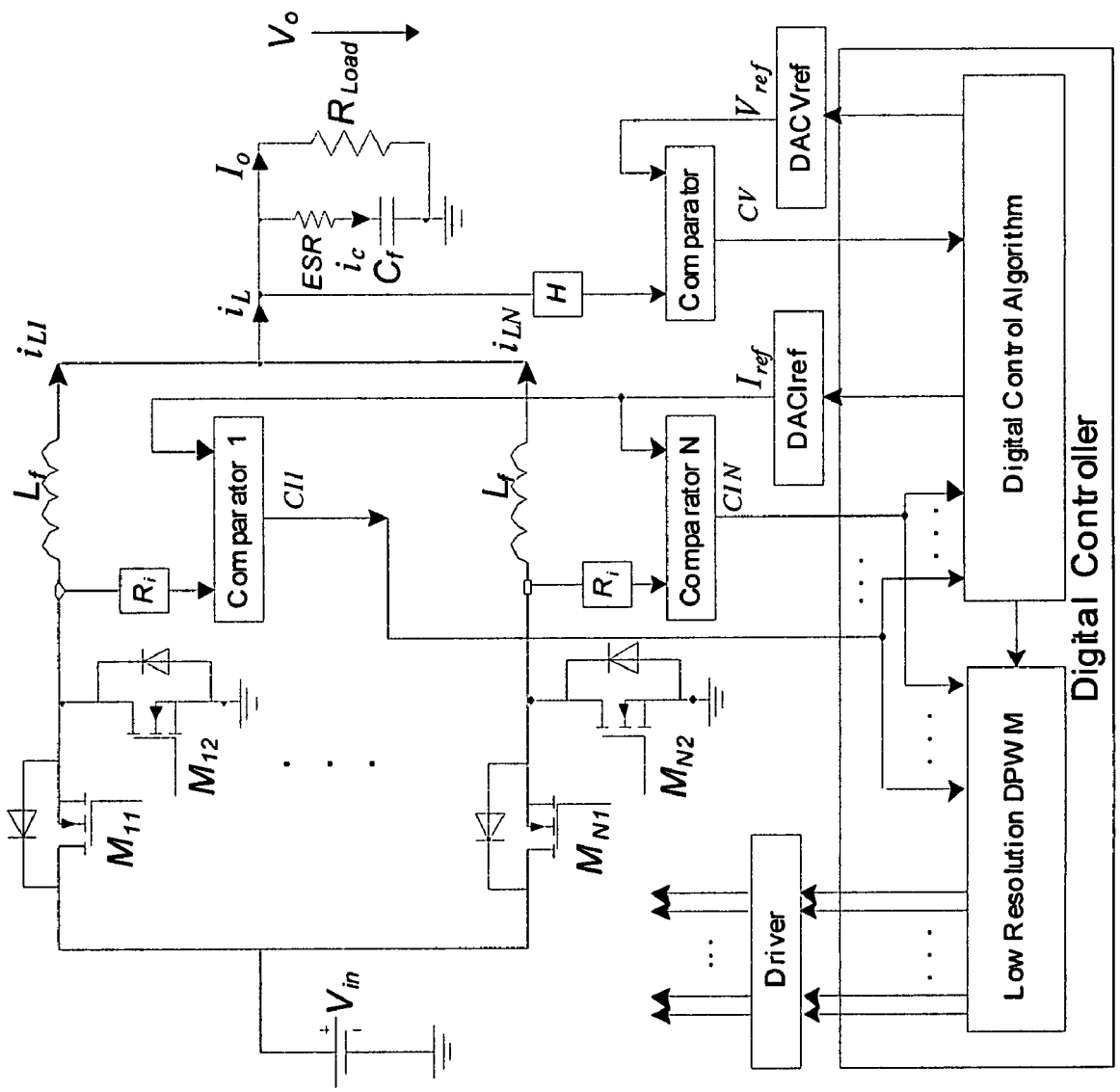
FIG. 7 is an example diagram of a multi-phase power supply circuit according to embodiments herein.

FIG. 7 is an example diagram illustrating an N-phase buck converter according to embodiments herein. A total of N+1 comparators are used. Inductor current of each phase is sensed separately and compared to the peak current reference Iref produced by the current DAC. The logic signal of the comparator of each phase is used to turn off its own high side MOSFET and turn on its own low side MOSFET, respectively. The turn-on signal of high side MOSFET and the turn-off signal of low side MOSFET are generated by the low resolution DPWM. The DPWM is implemented in the counter-comparator method. For an N-phase buck converter, the counter bit n is given as:

$$n = \text{int}(\log_2 N) \tag{8}$$

Where function int( ) takes the upper rounded integer value of the product.

Load Regulation and Effect of Quantization

The voltage regulation tolerance can be determined by the least significant bit (LSB) of the voltage DAC (n bits associated with reference voltage generators), as shown in Equation (5), where N is equal to 1. As discussed above, the average output voltage <Vo> tightly tracks with the average voltage reference <Vref> (or vise-versa), while the error between them is within ΔVref.

Figure 8:
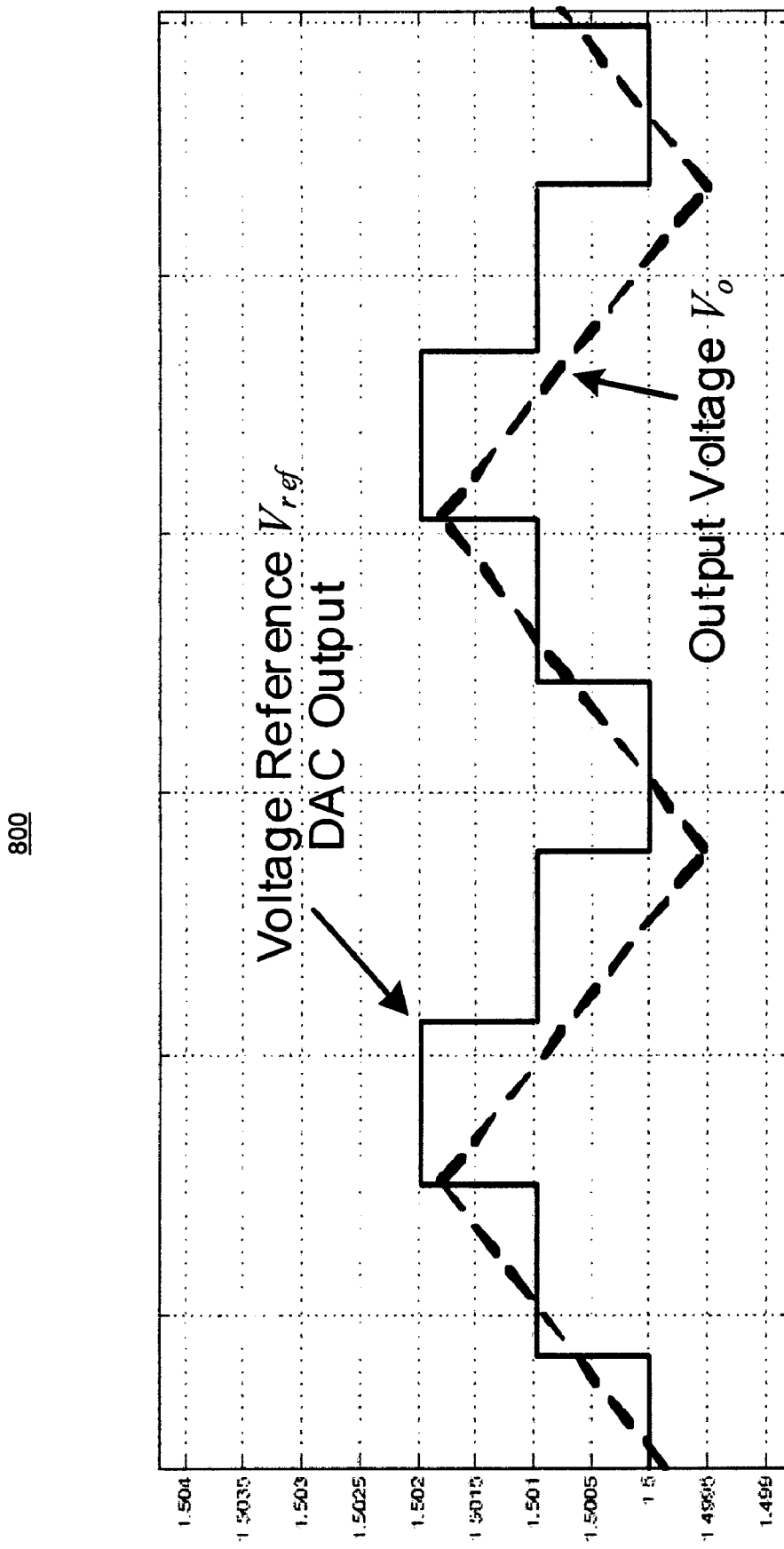
FIG. 8 is an example diagram illustrating how a reference voltage tracks an output voltage according to embodiments herein.

FIG. 8 is an example diagram illustrating how Vref (e.g., a step based, time-varying output voltage reference) tracks an output voltage when the ripple voltage is greater than ΔVref according to embodiments herein. It is shown that if ΔVref (e.g., 1 millivolt) is smaller than the voltage ripple ΔVp-p (≈2.3 mV, here), the voltage reference also will have the same shape as the voltage ripple and the difference between their average values is less than ΔVref. Note that, because of a large ripple voltage where the ripple voltage is greater than ΔVref, the voltage reference signal Vref steps down multiple successive times in a row so that it appropriately tracks the output voltage Vo.

For a given VRM embodiment, if the voltage regulation tolerance requirement is ΔVreg and allowed voltage variation range is ΔVtol, the minimum number n of bits of voltage DAC is given by:

$$n = \text{int}\left[\log_2\left(\frac{\Delta V_{tol}}{\Delta V_{reg}}\right)\right] \tag{9}$$

Where function int[ ] takes the upper rounded integer value of the product.

Because of the quantization of current reference DAC, the average inductor current <IL> only has finite discrete levels, which is defined by the least significant bit (LSB) of the current DAC (m bits). Therefore, a difference exits between Io and <IL>. The maximum difference is ΔIref.

Figure 9:
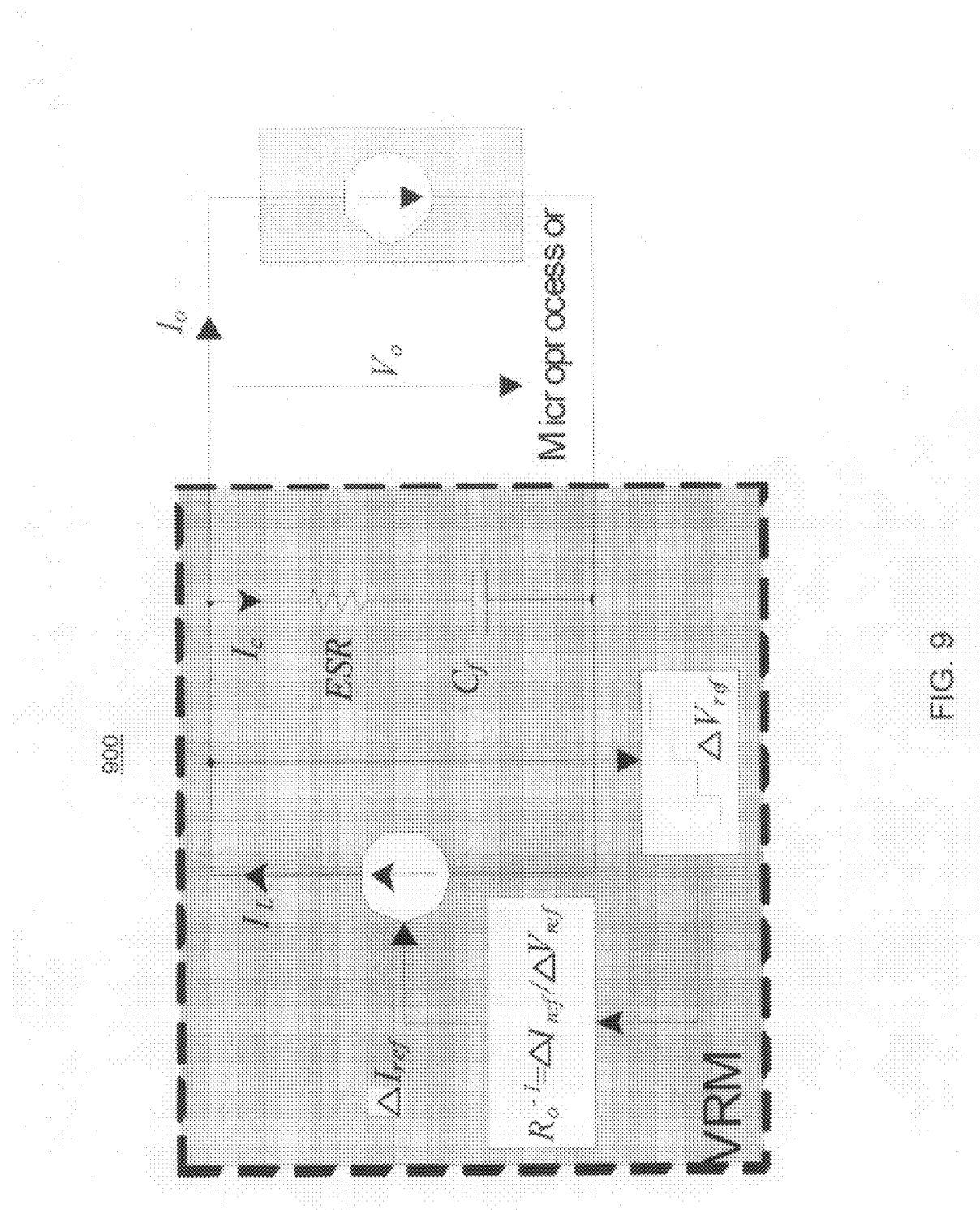
FIG. 9 is an example diagram illustrating a current source equivalent circuit of a power supply circuit according to embodiments herein.

FIG. 9 is an example diagram illustrating a current source equivalent circuit of power supply circuit 100 (e.g., a proposed buck converter) implementing peak current mode control according to embodiments herein. If the inductor current ripple is well averaged and not considered here, the dc current Ic through filtering capacitor Cf is given by:

$$I_c = <I_L> - I_o \leq \Delta I_{ref} \tag{10}$$

Thus, the voltage variation on filtering capacitor is calculated by:

$$\Delta V_o = ESR \cdot I_c + \frac{1}{C_f} \int_0^T I_c \cdot dt \leq \Delta I_{ref} \cdot \left(ESR + \frac{T}{C_f}\right) \tag{11}$$

To safely avoid the unacceptable large oscillation, in one switching period (T=1/fsw) the voltage variation is made to be less than 2 ΔVref, so we obtain:

$$\Delta I_{ref} \leq 2\Delta V_{ref} \bigg/ \left(ESR + \frac{1}{f_{sw} \cdot C_f}\right) \tag{12}$$

Over several DAC sampling periods (assume total i periods), the accumulated voltage variation ΔVo reaches ΔVref, and then Vref will be adjusted one step ΔVref, and Iref also will be adjusted by one step ΔIref. After that, the output voltage will vary toward opposite direction until ΔVo reaches ΔVref again (assume total j periods). The effective ΔILeff is given as:

$$\Delta I_{Leff} = \frac{i \cdot \Delta I_{ref}}{i + j} \tag{13}$$

Where, i and j depend on various factors such as ΔVref, ΔIref, and Ic. The most right item indicates the IL variation (ΔIL) caused by ΔVref.

Therefore, the low frequency oscillation caused by dithering has well-controlled amplitude (ΔVref), which can be made neglectable small. This low frequency oscillation can be eliminated if the condition as follow is met:

$$\Delta I_{ref} \leq \frac{\Delta V_{ref} \cdot (1 - D)}{2 \cdot L_f \cdot f_{sw}} \tag{14}$$

Figure 10:
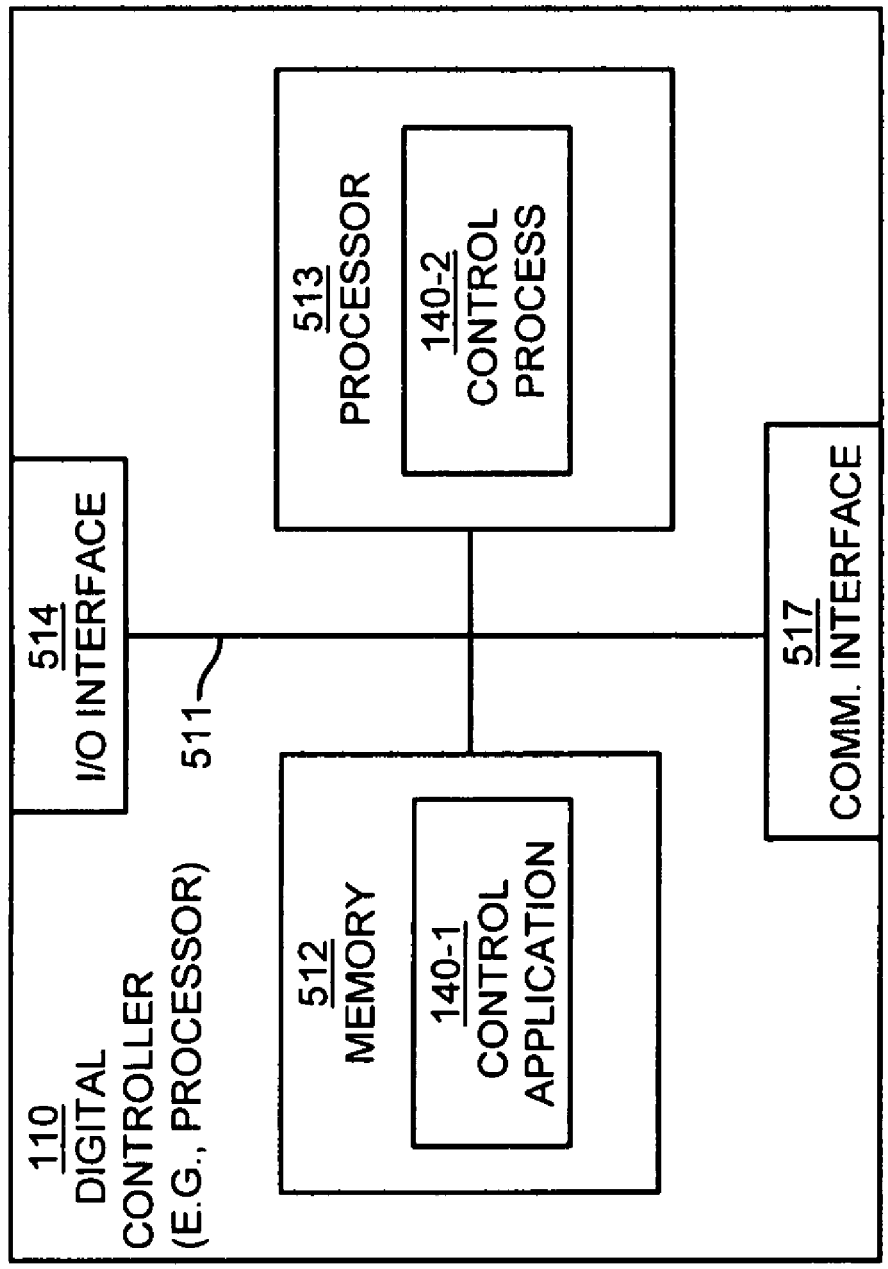
FIG. 10 is an example diagram of a digital controller device supporting control of power supply circuit according to embodiments herein.

FIG. 10 is a block diagram of an example architecture of digital controller 110 according to embodiments herein. Digital controller 110 can be a DSP (Digital Signal Processor), FPGA (Field Programmable Gate Array), micro-controller, microprocessor device, etc.

As shown, digital controller 110 of the present example includes an interconnect that couples memory system 512, a processor 513, I/O interface 514 (e.g., a driver interface), and communication interface 517.

As shown, memory system 512 can be encoded with control application 140-1 (e.g., control laws or rules) that enables digital controller 110 to support the functionality as described herein. Accordingly, control application 140-1 can be embodied as software code such as data and/or logic instructions (e.g., code stored in the memory or on another computer readable medium such as a disk) that supports processing functionality according to different embodiments described herein.

During operation of one embodiment, the processor associated with digital controller 110 accesses memory system 512 via the use of the interconnect in order to launch, run, execute, interpret or otherwise perform the logic instructions of the control application 140-1. Execution of the control application 140-1 produces processing functionality in control process 140-2. In other words, the control process 140-2 represents one or more portions of the control application 140-1 performing within or upon the digital controller 110.

It should be noted that, in addition to the control process 140-2 carrying out method operations as discussed herein, other embodiments herein include the control application 140-1 itself (i.e., the un-executed or non-performing logic instructions and/or data). The control application 140-1 may be stored on a tangible computer readable medium (e.g., a repository) such as a floppy disk, hard disk or in an optical medium. According to other embodiments, the control application 140-1 can also be stored in a memory type system such as in firmware, read only memory (ROM), or, as in this example, as executable code within the memory system 512 (e.g., within Random Access Memory or RAM).

Of course, in addition to being embodied as software, embodiments herein can be carried out via hardware or a combination of both hardware and software.

Figure 11:
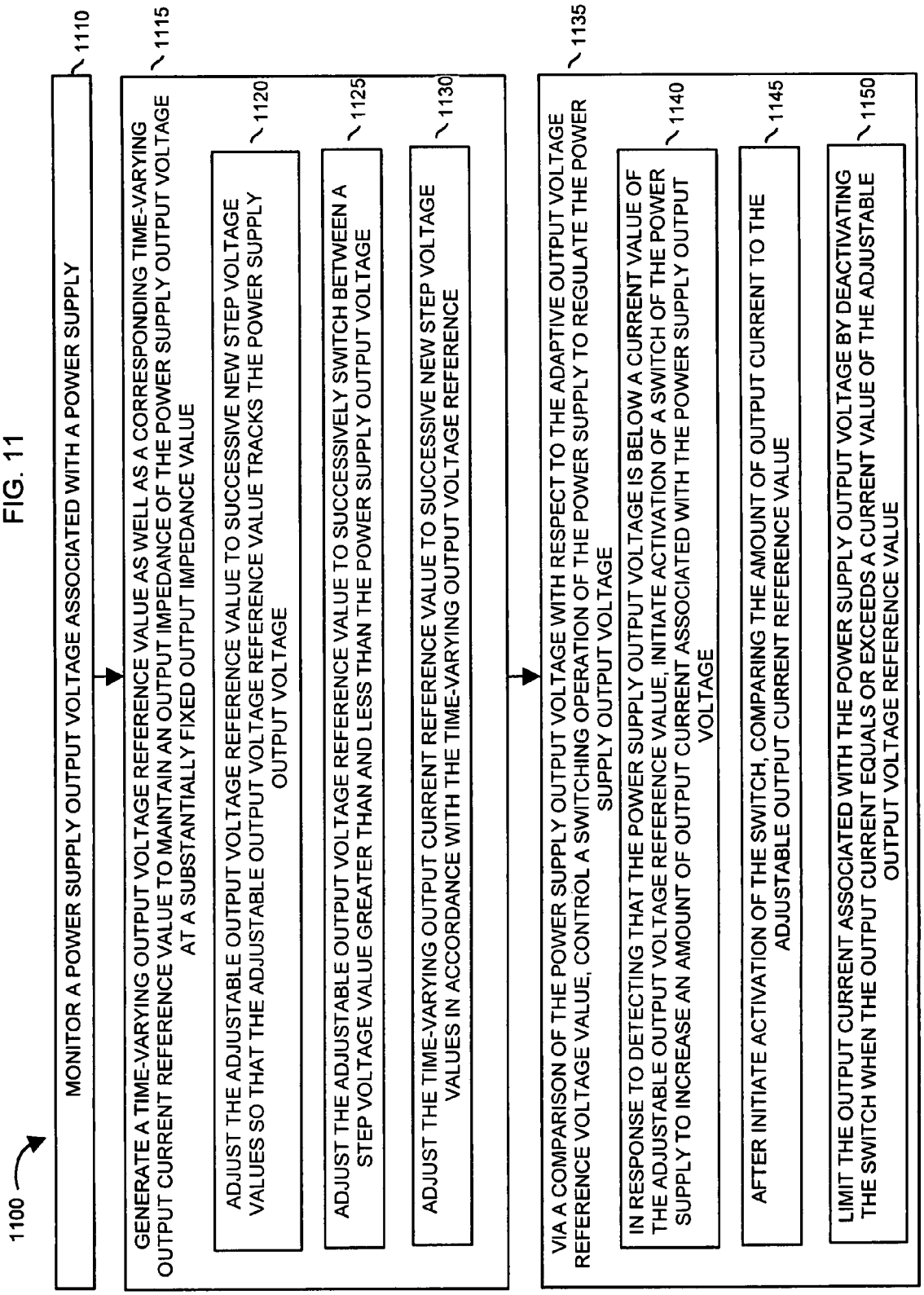
FIG. 11 is a flowchart illustrating an example of a method for implementing a power supply circuit according to embodiments herein.

FIG. 11 is an example flowchart 1100 illustrating a technique of supplying power according to embodiments herein.

In step 1110, the digital controller 110 monitors a power supply output voltage associated with a power supply 105.

In step 1115, the digital controller 110 generates a time-varying (e.g., adjusted) output voltage reference value (e.g., Vref) as well as a corresponding time-varying output current reference value (e.g., Iref) to maintain an output impedance of the power supply output voltage at a substantially fixed output impedance value.

In step 1120, the digital controller 110 adjusts the time-varying output voltage reference to successive new step voltage values so that the adjustable output voltage reference value tracks the power supply output voltage.

In step 1125, the digital controller 110 adjusts the time-varying output voltage reference to successively switch between a step voltage value greater than and less than the power supply output voltage.

In step 1130, the digital controller 110 adjusts the time-varying output current reference value (e.g., Iref) to successive new step voltage values in accordance with the time-varying output voltage reference and the fixed output impedance value.

In step 1135, via a comparison of the power supply output voltage with respect to the time-varying output voltage reference Vref, the digital controller 110 controls a switching operation of the power supply 105 to regulate the power supply output voltage.

In step 1140, in response to detecting that the power supply output voltage is below a current value of Vref, the digital controller 110 initiates activation of switch M1 of the power supply 105 to increase an amount of output current associated with the power supply output voltage.

In step 1145, after initiating activation of the switch, the digital controller 110 compares the amount of output current to voltage Iref.

In step 1150, the digital controller 110 limits the output current associated with the power supply output voltage Vo by deactivating the switch M1 when the output current associated with power supply 105 equals or exceeds a current value of Iref.

Note that techniques herein are well suited for use in switching applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
monitoring a power supply output voltage associated with a power supply;
generating an adaptive output voltage reference value to follow the power supply output voltage; and
via a comparison of the power supply output voltage with respect to the adaptive output voltage reference voltage value, controlling switching operation of the power supply to maintain the power supply output voltage within a desired range.

2. A method as in claim 1, wherein generating the adaptive output voltage reference value includes increasing the adaptive reference output voltage reference value by a step voltage amount in response to detecting that the power supply output voltage is greater than the adaptive output voltage reference value; and
wherein generating the adaptive output voltage reference value includes decreasing the adaptive reference output voltage reference value by the step voltage amount in response to detecting that the power supply output voltage is less than the adaptive output voltage reference value.

3. A method as in claim 1, for successive cycles of monitoring the power supply output voltage and generating the adaptive output voltage reference value, repeating steps of increasing the adaptive output voltage reference value by a pre-defined step voltage amount over the successive cycles until the adaptive output voltage reference value is greater than the power supply output voltage; and
in response to detecting a condition in which the adaptive output voltage reference value is greater than the power supply output voltage, decreasing the adaptive output voltage reference value by the step voltage amount.

4. A method as in claim 1 further comprising:
adjusting the adaptive reference voltage value up and down by a substantially fixed step voltage value over successive power supply output voltage monitoring cycles such that the adaptive output voltage reference value vacillates between a first step voltage reference setting that is greater than the power supply output voltage and a second step voltage reference setting that is less than the power supply output voltage.

5. A method as in claim 1 further comprising:
generating an adaptive output current reference value to control an amount of corresponding output current associated with the power supply output voltage;
adjusting a magnitude of the adaptive output voltage reference value to track the power supply output voltage; and
adjusting a magnitude of the adaptive output current reference value with respect to the adaptive output voltage reference value to maintain an output impedance of the power supply output voltage at a substantially constant value.

6. A method as in claim 5, wherein generating the adaptive output voltage reference value includes controlling successive values of the adaptive output voltage reference value to vacillate between respective voltage step values greater than and less than the power supply output voltage; and wherein generating the adaptive output current reference value includes modifying the adaptive output current reference value and the adaptive output voltage reference value relative to each other such that the power supply output voltage has a corresponding substantially constant output impedance.

7. A method as in claim 5 further comprising
receiving selection of a power supply output impedance value in which to control the output voltage and the amount of corresponding output current associated with the power supply circuit; and
wherein generating the adaptive output current reference value and generating the adaptive output voltage reference value includes:
producing a combination of the adaptive output current reference value relative to the adaptive output voltage reference value in accordance with the output impedance value.

8. A method as in claim 5, wherein controlling switching operation of the power supply circuit includes:
monitoring the amount of corresponding output current associated with the power supply output voltage; and
based on a comparison of the corresponding output current relative to the adaptive output current reference value, controlling regulator switches in the power supply circuit to maintain the output voltage within the desired range.

9. A method as in claim 1, wherein controlling switching operation of the power supply circuit includes:
periodically comparing the power supply output voltage with a current value of the adaptive output voltage reference value; and
in response to detecting that the power supply output voltage is less than the current value of the adaptive output voltage reference value, initiating activation of a regulator switch to increase an amount of current output associated with the power supply output voltage.

10. A method as in claim 9 further comprising:
deactivating the regulator switch in the power supply in response to detecting that the current output associated with the power supply output voltage exceeds a threshold value as specified by the adaptive output current reference value.

11. A method comprising:
monitoring a power supply output voltage associated with a power supply;
generating a time-varying output voltage reference value as well as a corresponding time-varying output current reference value to maintain an output impedance of the power supply output voltage at a substantially fixed output impedance value; and
via a comparison of the power supply output voltage with respect to the time-varying output voltage reference value, controlling switching operation of the power supply to regulate the power supply output voltage.

12. A method as in claim 11, wherein controlling the switching operation of the power supply includes:
in response to detecting that the power supply output voltage is below a current value of the time-varying output voltage reference value, initiating activation of a switch of the power supply to increase an amount of output current associated with the power supply output voltage.

13. A method as in claim 12, wherein controlling the switching operation of the power supply includes:
after initiating activation of the switch, comparing the amount of output current to the time-varying output current reference value; and
limiting the output current associated with the power supply output voltage by deactivating the switch when the output current equals or exceeds a current value of the time-varying output current reference.

14. A method as in claim 11, wherein generating the time-varying output voltage reference value includes:
periodically adjusting the time-varying output voltage reference value to successive new step voltage values so that the time-varying output voltage reference value tracks the power supply output voltage.

15. A method as in claim 14, wherein periodically adjusting the time-varying output voltage reference value includes:
periodically adjusting the time-varying output voltage reference value to successively switch between a step voltage value greater than and less than the power supply output voltage.

16. A method as in claim 11, wherein generating the time-varying output voltage reference value as well as the corresponding time-varying output current reference value includes:
for a first cycle:
setting the time-varying output voltage reference value to be a first step voltage value;
setting the corresponding time-varying output current reference to be a first step current value, the first step voltage value and the first step current value corresponding to the substantially fixed output impedance value;
for a second cycle:
setting the time-varying output voltage reference value to be a second step voltage value, which is greater than the first step voltage value;
setting the corresponding time-varying output current reference to be a second step current value, which is less than the first step current value, the second step voltage value and the second step current value corresponding to the substantially fixed output impedance value.

17. A power supply circuit comprising:
a power supply output voltage configured to drive a load;
a voltage sensing module configured to monitor the power supply output voltage;
a reference voltage generator circuit configured to generate an adaptive output voltage reference value, the adaptive output voltage reference value varying depending on a magnitude of the power supply output voltage; and
a comparator circuit configured to compare the power supply output voltage with the adaptive output voltage reference voltage value to control switching operation of the power supply to maintain the power supply output voltage within a desired range.

18. A power supply circuit as in claim 17, wherein the comparator circuit is configured to detect when the power supply output voltage is greater than the adaptive output voltage reference value; and
wherein the reference voltage generator circuit is configured to: i) receive input to increase the adaptive reference output voltage reference value by a step voltage amount in response to detection that the power supply output voltage is greater than the adaptive output voltage reference value, and ii) receive input to decrease the adaptive reference output voltage reference value by the step voltage amount in response to detection that the power supply output voltage is less than the adaptive output voltage reference value.

19. A power supply circuit as in claim 17, wherein the reference voltage generator circuit is configured to repeat steps of increasing the adaptive output voltage reference value by a pre-defined step voltage amount over the successive cycles until the adaptive output voltage reference value is greater than the power supply output voltage; and wherein the comparator circuit is configured to decrease the adaptive output voltage reference value by the step voltage amount in response to detection of a condition in which the adaptive output voltage reference value is greater than the power supply output voltage.

20. A power supply circuit as in claim 17, wherein the reference voltage generator circuit is configured to adjust the adaptive reference voltage value up and down by a substantially fixed step voltage value over successive power supply output voltage monitoring cycles such that the adaptive output voltage reference value vacillates between a first step voltage reference setting that is greater than the power supply output voltage and a second step voltage reference setting that is less than the power supply output voltage.

21. A power supply circuit as in claim 17, wherein the reference voltage generator circuit generates an adaptive output current reference value to control an amount of corresponding output current associated with the power supply output voltage.

22. A tangible computer-readable medium having instructions stored thereon, the instructions, when executed by a processing device, enabling the processing device to perform operations of:

monitoring a power supply output voltage associated with a power supply;

generating a time-varying output voltage reference value as well as a corresponding time-varying output current reference value to maintain an output impedance of the power supply output voltage at a substantially fixed output impedance value; and via a comparison of the power supply output voltage with respect to the adaptive output voltage reference voltage value, controlling switching operation of the power supply to regulate the power supply output voltage.

23. A tangible computer-readable medium as in claim 22, wherein the instructions, when executed by the processing device, enable the processing device to perform operations of:

in response to detecting that the power supply output voltage is below a current value of the time-varying output voltage reference value, initiating activation of a switch of the power supply to increase an amount of output current associated with the power supply output voltage.

24. A tangible computer-readable medium as in claim 23, wherein the instructions, when executed by the processing device, enable the processing device to perform operations of:

after initiating activation of the switch, comparing the amount of output current to the time-varying output current reference value; and limiting the output current associated with the power supply output voltage by deactivating the switch when the output current equals or exceeds a current value of the time-varying output current reference.

25. A tangible computer-readable medium as in claim 22, wherein the instructions, when executed by the processing device, enable the processing device to perform operations of:

periodically adjusting the time-varying output voltage reference value to successive new step voltage values so that the time-varying output voltage reference value tracks the power supply output voltage.

26. A tangible computer-readable medium as in claim 25, wherein the instructions, when executed by the processing device, enable the processing device to perform operations of:

periodically adjusting the time-varying output voltage reference value to successively switch between a step voltage value greater than and less than the power supply output voltage.

27. The method as in claim 11 further comprising, wherein generating the time-varying output voltage reference value as well as the corresponding time-varying output current reference value includes:

adjusting the time-varying output reference voltage value to successive new step voltage values such that the time-varying output reference voltage value approximates a magnitude of the power supply output voltage;

adjusting the time-varying output voltage reference value to successively switch between a first step voltage value that is greater than the power supply output voltage for a first duration and a second step voltage value that is less than the power supply output voltage for a second duration; and adjusting the time-varying output current reference value to successive new step voltage values in accordance with the time-varying output voltage reference.

28. The method as in claim 27, wherein controlling the switching operation of the power supply to regulate the power supply output voltage further comprises:

in response to detecting that the power supply output voltage is below a current value of the time-varying output current reference value, initiating activation of a switch of the power supply to increase an amount of output current provided to a load via the power supply output voltage;

after initiating activation of the switch, comparing the amount of output current to the time-varying output current reference value; and responsive to detecting that the output current exceeds a current threshold value as indicated by the time-varying output current reference value, limiting the output current associated with the power supply output voltage by deactivating the switch.

29. The method as in claim 1 further comprising:

adjusting a magnitude of the adaptive output voltage reference value to vary depending on a magnitude of the power supply output voltage.

30. The method as in claim 29 further comprising:

generating an adaptive output current reference value to control an amount of corresponding output current associated with the power supply output voltage; and adjusting a magnitude of the adaptive output current reference value relative to the adaptive output voltage reference value to maintain an output impedance of the power supply output voltage at a substantially constant output impedance value over different load values powered by the power supply output voltage.

31. The method as in claim 30 further comprising:

increasing a magnitude of the adaptive output current reference value at substantially a same time as decreasing a magnitude of the adaptive output voltage reference value; and decreasing a magnitude of the adaptive output current reference value at substantially a same time as increasing the magnitude of the adaptive output voltage reference value.

32. The method as in claim 31 further comprising:
monitoring a magnitude of corresponding output current provided to a load by the power supply output voltage;
based on a comparison of the corresponding output current relative to the adaptive output current reference value, controlling regulator switches in the power supply to maintain the power supply output voltage within the desired range;
monitoring a magnitude of the power supply output voltage; and
based on a comparison of the power supply output voltage relative to the adaptive output voltage reference value, controlling the regulator switches in the power supply to maintain the power supply output voltage within the desired range.

33. The method as in claim 32, wherein generating the adaptive output voltage reference value includes: switching between setting the magnitude of the adaptive output voltage reference value to be greater than the power supply output voltage and less than the power supply output voltage.

34. A power supply circuit as in claim 17, wherein the adaptive output voltage reference value tracks the power supply output voltage.

* * * * *